United States Patent

Miyao et al.

[11] 3,913,325
[45] Oct. 21, 1975

[54] OUTPUT SPLIT TYPE HYDROSTATIC TRANSMISSION

[75] Inventors: Takayuki Miyao; Toshimitsu Sakai, both of Toyota, Japan

[73] Assignees: Toyota Jidosha Kogyo Kabushiki Kaisha; Aisin Seiki Kabushiki Kaisha, Japan

[22] Filed: Aug. 30, 1974

[21] Appl. No.: 501,979

[30] Foreign Application Priority Data
Sept. 5, 1973    Japan.............................. 48-99890

[52] U.S. Cl. ........................ 60/431; 60/449; 74/687
[51] Int. Cl.² ......................................... F16H 39/46
[58] Field of Search .......... 74/687, 718, 720, 720.5, 74/730, 731; 60/431, 437, 438, 439, 440, 449

[56] References Cited
UNITED STATES PATENTS

| | | | |
|---|---|---|---|
| 3,302,487 | 2/1967 | Kempson .......................... | 74/687 X |
| 3,733,931 | 5/1973 | Nyman et al. ..................... | 74/687 X |
| 3,855,793 | 12/1974 | Pollman et al. ....................... | 60/431 |

*Primary Examiner*—Edgar W. Geoghegan
*Attorney, Agent, or Firm*—Oblon, Fisher, Spivak, McClelland & Maier

[57] ABSTRACT

A hydrostatic transmission comprises a hydraulically controlled speed differential means drivingly connected with an output shaft for transmitting the rotation torque of an input shaft to the output shaft and including a hydraulic element functionable as a reaction element therefor, a hydraulic positive displacement pump-motor of the variable type drivingly connected with the input shaft for controlling the hydraulic element in accordance with the pump angle thereof, a line circuit to provide hydraulic communication between the hydraulic element and the pump-motor, and a hydraulically operated drive power train selector device to selectively complete the forward and reverse drive power trains between the input shaft and the output shaft. The hydrostatic transmission further comprises an automatic control mechanism to preliminarily set the initial pump angle of the pump-motor in response to the shifting operation of the drive power train selector device and sequentially vary the pump angle in accordance with the driving condition of the input shaft.

5 Claims, 4 Drawing Figures

OUTPUT SPLIT TYPE HYDROSTATIC TRANSMISSION

BACKGROUND OF THE INVENTION

The present invention relates to an output split type hydrostatic transmission for a wheeled vehicle, industrial equipment and the like, and more particularly to an improved hydro-mechanical transmission which comprises a hydraulically controlled speed differential means drivingly connected with an output means for transmitting the rotation torque of an input means to the output means and a hydraulic positive displacement pump-motor driven by the input means to hydraulically control a reaction element provided within the speed differential means in response to the displacement ratio thereof.

SUMMARY OF THE INVENTION

The main object of the present invention is to provide an output split type hydrostatic transmission of the mentioned type, wherein an automatic control mechanism preliminarily sets the pump-motor to its full positive displacement or full negative displacement in response to the shifting operation of a forward-reverse drive power train selector device for the transmission and sequentially controls the displacement ratio of the pump-motor in accordance with the driving condition of the input means.

BRIEF DESCRIPTION OF THE DRAWINGS

Various other objects, features and attendant advantages of the present invention will be more fully appreciated as the same becomes better understood from the following detailed description, especially when considered in conjunction with the accompanying drawings, in which like reference numerals designate like or corresponding parts throughout the several views, and wherein.

DESCRIPTION OF AN ILLUSTRATED EMBODIMENT

Figure 1:
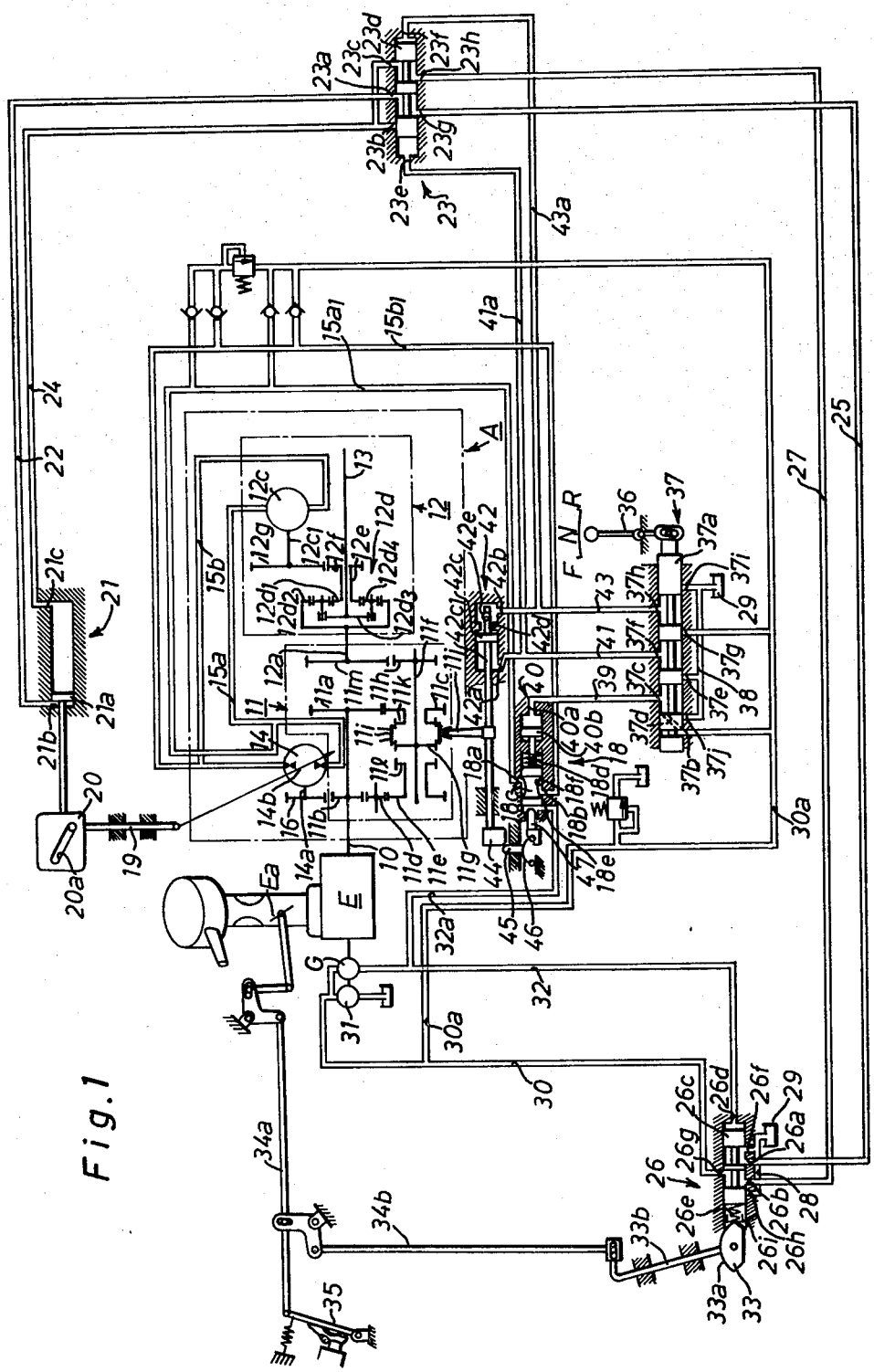
FIG. 1 is a schematic skeleton view showing a preferred embodiment of a hydrostatic transmission in accordance with the present invention.

Referring now in particular to FIG. 1 of the drawings, there is shown a first preferred embodiment of an output split type hydrostatic transmission A in accordance with the present invention. The hydrostatic transmission A comprises an input shaft 10 driven by a prime engine E, a forward-reverse drive power train selector gear unit 11 (hereinafter designated as a selector gear unit 11), a hydraulically controlled differential gear unit 12 including an intermediate shaft 12a, a single planetary gear set 12d and a first positive-displacement pump-motor 12c of the fixed type, an output shaft 13 regulated by the differential gear unit 12, and a second positive-displacement pump-motor 14 of the variable type driven by the prime engine E. The shafts 10, 12a and 13 are coaxially journalled on the transmission housing, not shown in the figure. The first and second pump-motors 12c and 14 are hydraulically connected with each other by means of hydraulic circuits 15a and 15b.

The selector gear unit 11 is to determine a drive power train of the transmission and comprises gears 11a and 11b secured on the input shaft 10, and idler gear 11d in mesh with the gear 11b, and gears 11c and 11e which engage respectively with the gear 11a and the idler gear 11d. The gears 11c and 11e are provided respectively with integral outersplines 11k and 11l and are rotatably journalled on a counter shaft 11f. The counter shaft 11f includes thereon an outerspline 11g aligned therebetween with the splines 11k and 11l. A gear 11h is fixed on the right end of the counter shaft 11f in the figure and in mesh with a gear 11m fixed on the intermediate shaft 12a.

The selector gear unit 11 further includes a slide sleeve 11i having thereon an inner-spline selectively engageable with the outer spline 11g, with the outer splines 11g and 11k or with the outer splines 11g and 11l. The slide sleeve 11i is shifted by a lever 11j. Shifting of the lever 11j to its rightward position engages the sleeve 11i with the splines 11g and 11k to complete a drive power train by the gears 11a, 11c, 11h and 11m. This completes the forward drive power train of the transmission. When the lever 11j is shifted to its leftward position, the sleeve 11i engages with the splines 11g and 11l to complete a drive power train by the gears 11b, 11d, 11e, 11h and 11m. This completes the reverse drive power train of the transmission. Positioning of the lever 11j to its neutral position keeps the sleeve 11i disengaged from either of the splines 11k and 11l, thereby no torque-transmission is made from the input shaft 10 to the intermediate shaft 12a.

The single planetary gear set 12d comprises a sun gear $12d_1$ secured on the left end of a reaction shaft 12e which is rotatably disposed in surrounding relationship to the output shaft 13, a planet gear $12d_4$ in mesh with the sun gear $12d_1$, a ring gear $12d_2$ in mesh with the planet gear $12d_4$ and fixed on the right end of the intermediate shaft 12a, and a carrier $12d_3$ secured on the left end of the output shaft 13 and journalling the planet gear $12d_4$ thereon. A gear 12f is secured on the right end of the reaction shaft 12e and meshed with a gear 12g fixed on a shaft $12c_1$ of the first pump-motor 12c.

The second positive-displacement pump-motor 14 has a swash plate 14b to vary the displacement capacity thereof. A shaft 14a of the pump-motor 14 is drivingly connected to the input shaft 10 by way of a gear 16 fixed on the shaft 14a and in mesh with the gear 11b of the input shaft 10 to be driven by the engine E always at a constant rotation ratio. The hydraulic line circuits 15a and 15b to connect the first pumpmotor 12c with the second pump-motor 14 include first and second branch circuits $15a_1$ and $15b_1$ which are extended respectively from the circuits 15a and 15b and connected to each other through a bypass valve 18.

The bypass valve 18 comprises a spool 18c slidably engaged within a cylindrical bore 18f which is provided with a first port 18a connected to the first branch circuit $15a_1$, a second port 18b connected to the second branch circuit $15b_1$ and a third port 18e connected to a small pump 31 driven by the prime engine E by way of a branch passage 32a and a governor valve G. The spool 18c is biased leftwardly by a coil spring 18d and is urged rightwardly by governor pressure given to the left face thereof from the pump 31 through the governor valve G, the branch passage 32a and the port 18e. The spool 18c may be displaced leftwardly by thrusting force of a first actuator 40 when activated and moved rightwardly by a pushing rod 47 which is actuated by engagement of a rod 45 and a cam 44. The rod 45 is mounted on a bow spring 46 pivoted at its both ends on a portion of the transmission housing and the pushing rod 47 and is pushed downwardly by the engagement with the cam 44 to move rightwardly the pushing rod 47. The cam 44 is fixed on the left end of a piston rod $42c_1$ of a second actuator 42 to be moved rightwardly or leftwardly by the actuator 42, the piston rod $42c_1$ having the lever 11j of the selector gear unit 11 at its central portion.

The first actuator 40 includes a piston 40b slidably engaged with a cylindrical bore which is coaxial with the bore 18f of the bypass valve 18 and includes a port 40a connected to the small pump 31 by way of a passage 39, a manual shift valve 37 and a branch passage 39a extended from a passage 30. The piston 40b has a piston rod extended therefrom to push the spool 18c of the bypass valve 18. The second actuator 42 includes a piston 42c slidably engaged within a cylindrical bore which is provided therein with a shoulder 42d to receive the piston 42c thereon and provided at its both ends with first and second ports 42a and 42b, the piston rod $42c_1$ being extended from the piston 42c and having an enlarged portion 42e thereon. The first port 42a is connected to the small pump 31 by the way of a passage 41, the manual shift valve 37 and the branch passage 30a. The second port 42b is also connected to the small pump 31 by way of a passage 43, the manual shift valve 37 and the branch passage 30a.

In the manual shift valve 37, when a spool 37a is positioned in its neutral or N position, the passage 39 is connected to the branch passage 30a through a port 37c, a passage 37d provided on the spool 37a and a port 37b to activate the first actuator 40. When the spool 37a is shifted to its forward or F position by means of a shift lever 36, the passage 41 is connected to the branch passage 30a through ports 37f and 37g to supply pressurized fluid from the small pump 31 into a left chamber of the second actuator 42. At the same time, the passage 39 is connected to a reservoir 29 through ports 37c and 37e to deactivate the first actuator 40 and the passage 43 is connected to the reservoir 29 through ports 37h and 37i. Consequently, the second actuator 42 is activated to move the piston 42c rightwardly and, in turn, the lever 11j of the selector gear unit 11 and the cam 44 are shifted rightwardly in response to the rightward movement of the piston rod $42c_1$. In this instance, the spool 18c of the bypass valve 18 is temporarily moved rightwardly against the biasing force of the spring 18d by the pushing rod 47 in response to the engagement of the cam 44 with the rod 45. Furthermore, when the manual shift valve 37 is positioned in its reverse or R position, the passage 43 is connected to the branch passage 30a through the ports 37h and 37g to supply pressurized fluid from the pump 31 into a right chamber of the second actuator 42, and on the other hand, the passages 39 and 41 are connected to the reservoir 29 through the ports 37c, 37j and 37f, 37e, respectively. This activates the second actuator 42 to move the piston 42c leftwardly and, in turn, the lever 11j of the selector gear unit 11 and the cam 44 are shifted leftwardly in response to the leftward movement of the piston rod $42c_1$. In this instance, the spool 18c of the bypass valve 18 is temporarily moved rightwardly against the biasing force of the spring 18d by the pushing rod 47 in response to the engagement of the cam 44 with the rod 45.

The first line circuit 15a is in open communication with the port 18a of the bypass valve 18 by way of the first branch circuit $15a_1$ and the second line circuit 15b is in open communication with the port 18b of the bypass valve 18 by way of the second branch circuit $15b_1$. Thus, when the manual shift valve 37 is positioned in its N position during the idling rotation of the engine E, the first actuator 40 is activated and the spool 18c of the bypass valve 18 stays at its original position, as shown in the figure, since the governor pressure applied to the left face of the spool 18c through the port 18e is balanced with the biasing forces of the coil spring 18d and the actuator 40. Consequently, the ports 18a and 18b are connected to each other to complete communication between the first and second branch circuits $15a_1$ and $15b_1$. When the engine rotation exceeds its idling one under this state, the governor pressure supplied to the port 18e overcomes the biasing forces of the coil spring 18d and the actuator 40 and displaces the spool 18c rightwardly in the figure to block the communication between the first and second branch circuits $15a_1$ and $15b_1$. This completes a circulating closed circuit between the first and second pump-motors 12c and 14.

When the shift lever 36 of the manual shift valve 37 is shifted to its F position during the idling rotation of the engine E, the second actuator 42 is activated to move the piston 42c rightwardly and the first actuator 40 is deactivated. As the result, the cam 44 on the piston rod $42c_1$ engages with the rod 45 in response to the shifting of the shift lever 36 prior to the engagement between the sleeve 11i and the spline 11k and the spool 18c is moved rightwardly against the biasing force of the coil spring 18d by the thrusting force of the pushing rod 47 to temporarily block the communication between the first and second branch circuits $15a_1$ and $15b_1$. After the engagement between the sleeve 11i and the spline 11k, the cam 44 disengages from the rod 45 and the spool 18c is moved by the coil spring 18d to its original position to provide communication between the first and second branch circuits $15a_1$ and $15b_1$. Under this state, when the engine rotation exceeds its idling one, the governor pressure applied to the bypass valve 18 overcomes the biasing force of the coil spring 18d and displaces the spool 18c rightwardly to block the communication between the first and second branch circuits $15a_1$ and $15b_1$, thereby to complete the circulating closed circuit between the first and second pump-motors 12c and 14.

When the shift lever 36 of the manual shaft valve 37 is shifted to its R position during the idling rotation of the engine E, the second actuator 42 operates to move the piston 42c leftwardly and the cam 44 on the piston rod $42c_1$ engages with the rod 45 in response to the shifting of the lever 36 prior to the engagement between the sleeve 11i and the spline 11l. Then, the spool 18c is moved rightwardly against the biasing force of the coil spring 18d by the thrusting force of the pushing rod 47 to temporarily block the communication between the first and second branch circuits $15a_1$ and $15b_1$. After the engagement of the sleeve 11i with the spline 11l, the cam 44 disengages from the rod 45 and the spool 18c is moved by the coil spring 18d to its original position to provide communication between the first and second branch circuits $15a_1$ and $15b_1$. Under this state, when the engine rotation exceeds its idling speed, the governor pressure applied to the bypass valve 18 overcomes the biasing force of the coil spring 18d and displaces the spool 18c rightwardly to block the communication between the first and second branch circuits $15a_1$ and $15b_1$, thereby to complete the circulating closed circuit between the first and second pump-motors 12c and 14.

In the mentioned shifting operation of the manual shift valve 37, a meshing engagement between the slide sleeve 11i and the spline 11k of the gear 11c or the spline 11l of the gear 11e is synchronously conducted to complete either the forward or reverse drive power train of the selector gear unit 11 as described below in detail, since the hydraulically controlled differential gear unit 12 is operated by the first pump-motor 12c which is hydraulically interlocked with the second pump-motor 14 in response to the completion of the circulating closed circuit between the pump-motors 12c and 14 upon the shifting operation of the shift lever 36.

When the shift lever 36 is positioned at its N position during the idling of the engine E, no rotation torque of the engine E is transmitted to the intermediate shaft 12a and the bypass valve 18 maintains its original condition to interrupt the fluid communication between the first and second pump-motors 12c and 14. Under this state, the second pumpmotor 14 and the small pump 31 merely keep their idling rotation and for the shifting operation of the selector gear unit 11, the second pump-motor 14 is conditioned to its full displacement in a positive direction.

When the shift lever 36 is shifted to its F position, the bypass valve 18 blocks the communication between the first and second branch circuits $15a_1$ and $15b_1$ to temporarily complete the circulating closed circuit between the first and second pump-motors 12c and 14 in advance of the completion of the forward drive power train within the selector gear unit 11. Then, the first pump-motor 12c rotates as a motor by the fluid pressure applied thereto from the second pump-motor 14 through the first line circuit 15a. The rotation torque of the shaft $12c_1$ of the pump-motor 12c is transmitted to the intermediate shaft 12a by way of the single planetary gear set 12d as the output shaft 13 is locked by the load exerted thereon. This rotation torque is transmitted to the counter shaft 11f of the selector gear unit 11 through the gears 11m and 11h. Consequently, the counter shaft 11f, the outer spline 11g and the slide sleeve 11i rotate in the same direction as the spline 11k of the gear 11c in mesh with the gear 11a for the mentioned synchronous meshing engagement.

In the forward drive operation of the transmission, after the synchronized meshing engagement between the slide sleeve 11a and the spline 11k of the gear 11c is completed by means of the shifting operation of the manual shift valve 37, the first and second branch circuits $15a_1$ and $15b_1$ are connected to each other across the bypass valve 18 disposed in its original position so that no load is given to the first and second pump-motors 12c and 14. In this instance, the single planetary gear set 12d is driven by the rotation torque of the input shaft 10 to rotate the first pump-motor 12c as a pump and on the other hand, the ouptut shaft 13 is arrested by the load exerted thereon.

When the engine E is accelerated, the bypass valve 18 isolates the first branch circuit $15a_1$ from the second branch circuit $15b_1$ to complete the circulating closed circuit for the first and second pump-motors 12c and 14. Thus, the pressurized fluid discharged from the first pump-motor 12c is regulated by the second pump-motor 14.

Figure 2:
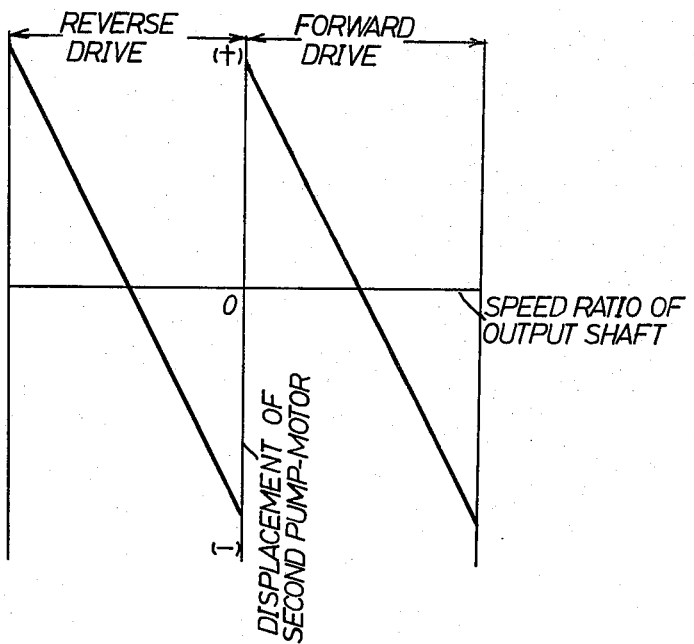
FIG. 2 is a graphic chart illustrating certain operating characteristics of the transmission.

Under the mentioned state, as the pump displacement of the second pump-motor 14 is decreased, a hydraulic load is exerted on the first pump-motor 12c in accordance with the pump angle of the second pump-motor 14 to decrease the rotation speed of the first pump-motor 12c below that while the output shaft 13 is arrested. Thus, the single planetary gear set 12d transmits the rotation torque of the input shaft 10 to the output shaft 13 in response to the reaction force exerted thereon from the first pump-motor 12c. Consequently, the rotation speed ratio of the output shaft 13 against the input shaft 10 increases in proportion to the decrease of the pump displacement of the second pump-motor 14 as shown in FIG. 2. When the second pump-motor 14 is conditioned to its zero displacement, no pressurized fluid can pass through the second pump-motor 14 to arrest the rotation of the first pump-motor 12c. Then, all the engine torque given to the input shaft 10 is mechanically transmitted to the output shaft 13 by way of the single planetary gear set 12d.

When the pump angle of the second pump-motor 14 is over-centered or positioned in the negative direction, the rotation torque of the input shaft 10 rotates the second pumpmotor 14 as a pump and is then converted into hydraulic pressure by the pumping operation of the second pump-motor 14. This hydraulic pressure is applied to the first pump-motor 12c through the second line circuit 15b. Thus, the first pumpmotor 12c conducts its motor operation to convert the hydraulic pressure into the rotation torque of the shaft $12c_1$ of the first pump-motor 12c. This rotation torque is finally transmitted to the output shaft 13 by way of the single planetary gear set 12d. In proportion to the increase of the displacement in the negative direction of the second pump-motor 14, the discharging amount of the pump-motor 14 per rotation of the input shaft 10 increases to proportionately increase the rotation torque of the first pump-motor 12c so as to further increase the speed ratio of the hydrostatic transmission, as shown in FIG. 2.

In the case that the shift lever 36 of the manual shift valve 37 is shifted to its R position, the synchronized meshing engagement for the reverse drive power train can be conducted substantially the same as in the forward drive with one difference in the starting state to condition the second pump-motor 14 to its full displacement in the negative direction as shown in FIG. 2.

Described hereinafter is an automatic control mechanism to preliminarily set the initial position of the swash plate 14b of the second pump-motor 14 in accordance with the shifting operation of the manual shift valve 37 and to continuously vary the pump angle of the second pump-motor 14 in response to the driving condition of the engine E. The control mechanism comprises a third actuator 21 to move the swash plate 14b, a selector valve 23 to set the initial position of the piston 21a of the third actuator 21, and a servo valve 26 to hydraulically control the movement of the piston 21a of the third actuator 21.

In the third actuator 21, the piston 21a is integrally connected with a cam plate 20, and ports 21b and 21c are connected respectively to ports 23a and 23b of the selector valve 23 by way of passages 22 and 24. The cam plate 20 is reciprocatable rightwardly and leftwardly in the figure and provided thereon with a cam slot 20a to slidably hold the top end of a rod 19 therethrough. The rod 19 is operatively connected at its other end with the swash plate 14b to vary the pump angle of the second pump-motor 14. With this third actuator 21, when the piston 21a is displaced to its leftward stroke end, the second pump-motor 14 is conditioned at its full displacement in the positive direction by the downward movement of the rod 19. When the piston 21a is displaced rightwardly from its leftward stroke end, the pump angle of the second pump-motor 14 is decreased and reversed in accordance with the rightward displacement of the piston 21a by the upward movement of the rod 19. Thus, the second pump-motor 14 is conditioned to its full displacement in the negative direction when the piston 21a reaches to its rightward stroke end.

The selector valve 23 includes a spool 23d slidably engaged within a cylindrical bore which is provided at its ends with ports 23e and 23f. The port 23e is in open communication with the passage 41 through a passage 41a and the port 23f is in open communication with the passage 43 through a passage 43a. The selector valve 23 is further provided with ports 23g and 23h at the opposite side of the ports 23a and 23b. The port 23g is connected to a port 26a of the servo valve 26 through a passage 25 and the port 23h is connected to a port 26b of the servo valve 26 through a passage 27. The port 23b is also connected with a port 23c at the opposite side of the port 23h. In this selector valve 23, when the manual shift valve 37 is shifted to its F position, the port 23e is connected to the pump 31 by way of the passages 41a and 41, the manual shift valve 37 and the branch passage 30a. At the same time, the port 23f is connected to the reservoir 29 by way of the passages 43a and 43, the manual shift valve 37 and the passage 38. Consequently, the spool 23d is displaced rightwardly by the hydraulic pressure applied to the port 23e from the pump 31 so as to connect the ports 23a and 23c with the ports 23g and 23h respectively. When the manual shift valve 37 is shifted to its R position, the port 23f is connected to the pump 31 by way of the passages 43a and 43, the manual shift valve 37 and the branch passage 30a. At the same time, the port 23e is connected to the reservoir 29 by way of the passages 41a and 41, the manual shift valve 37 and the passage 38. Then, the spool 23d is displaced leftwardly by the hydraulic pressure applied to the port 23f from the pump 31 to connect the ports 23b and 23a with the ports 23g and 23h respectively.

The servo valve 26 comprises a spool 26c interlocked with a cam 33 through a retainer 26i and a coil spring 26e.

The spool 26c functions to selectively connect a port 26g with either of a port 26a or 26b by the movement thereof. The port 26g is connected to the pump 31 through the passage 30. The port 26a is in open communication with the port 23g of the selector valve 23 through the passage 25 and selectively connected to the reservoir 29 through a port 26f in response to the movement of the spool 26c. The port 26b is in open communication with the port 23h of the selector valve 23 through the passage 27 and selectively connected to the reservoir 92 through a port 26h in response to the movement of the spool 26c. The movement of the spool 26c is controlled by the operation of the cam 33 and governor pressure supplied into a port 26d from the pump 31 through the governor valve G and a passage 32. The cam 33 is pivoted on the lower end of a rod 33b which is interlocked with a link 34a by way of a link 34b. The link 34a is connected at its one end with an accelerator pedal 35 and connected at its other end to a throttle valve Ea of the engine E.

The operation of the mentioned automatic control mechanism is described below in detail. When the manual shift valve 37 is positioned in its N position during the idling rotation of the engine E and the selector gear unit 11 is positioned in its neutral position, the servo valve 26 functions to connect the passage 30 with the passage 27 and to connect the passage 25 with the drain passage 28. In this instance, the spool 26c is biased rightwardly by the coil spring 26e.

When the manual shift valve 37 is shifted to its F position to synchronously complete the forward drive power train of the selector gear unit 11, the spool 23d of the selector valve 23 is moved rightwardly in response to the activation of the second actuator 42 by the pressurized fluid applied to the port 23e from the pump 31 through the passages 41a and 41, the manual shift valve 37, and the passages 30a and 30 in sequence. Thus, the selector valve 23 acts to connect the passage 27 with the passage 24 and to connect the passage 25 with the passage 22, and the piston 21a of the third actuator 21 is displaced to its leftward stroke end by means of the pressurized fluid applied to the port 21c from the pump 31 through the passages 30, 27 and 24 thereby to make the second pump-motor 14 conditioned to its full displacement in the positive direction.

Under this state, when the accelerator pedal 35 is depressed to increase the rotation of the engine E and the differential gear unit 12 is operated, the spool 26c of the servo valve 26 is moved leftwardly by the governor pressure applied to the port 26d from the pump 31 through the governor valve G and the passage 32. Then, the servo valve 26 functions to connect the passage 30 with the passage 25 and to connect the passage 27 with the drain passage 28. This connects the port 21b of the actuator 21 to the pump 31 through the passages 22, 25 and 30. At the same time, the port 21c is connected to the drain passage 28 through the passages 24 and 27. Then, the piston 21a of the third actuator 21 is moved rightwardly by means of the pressurized fluid applied to the port 21b from the pump 31 to decrease the pump angle of the second pump-motor 14 toward the negative direction. Thus, the differential gear unit 12 is controlled in accordance with the change of the pump angle of the second pump-motor 14 to increase the speed ratio of the hydrostatic transmission.

In the operation of the hydrostatic transmission, when the load given to the engine E from the output shaft 13 increases during the increasing of the speed ratio of the transmission, the engine rotation decreases. Then, the spool 26c of the servo valve 26 is moved rightwardly by the biasing force of the coil spring 26e in response to the decrease of the governor pressure given from the pump 31 thereby to block the communication between the passages 25 and 30 and the communication between the passages 27 and 28. This causes the arresting of the piston 21a of the third actuator 21 to control the operation of the differential gear unit 12 so as to maintain the instant rotation of the engine E. Under this state, when the accelerator pedal 35 is further depressed, the spool 26c of the servo valve 26 is moved rightwardly by the biasing force of the spring 26e in response to the rotation of the cam 33 to connect the passage 25 with the drain passage 28 and connect the passage 27 with the passage 30. This causes the leftward movement of the piston 21a of the third actuator 21 to decrease the speed ratio of the hydrostatic transmission thereby to increase the engine rotation. The increasing of the engine rotation moves the spool 26c of the servo valve 26 leftwardly by increasing of the governor pressure applied to the port 26d from the pump 31. When the spool 26c is moved leftwardly, the servovalve 26 functions to connect the passage 25 with the passage 30 and connect the passage 27 with the drain passage 28. This causes the rightward movement of the piston 21a of the third actuator 21 to increase the speed ratio of the hydrostatic transmission.

When the manual shift valve 37 is shifted to its R position to synchronously complete the reverse drive power train of the selector gear unit 11, the spool 23d of the selector valve 23 is moved leftwardly in response to the activation of the second actuator 42 by the pressurized fluid applied to the port 23f from the pump 31 through the passages 43a and 43, the manual shift valve 37, and the passages 30a and 30 in sequence. Then, the selector valve 23 acts to connect the passage 25 with the passage 24 and connect the passage 27 with the passage 22, and the piston 21a of the third actuator 21 is displaced to its rightward stroke end by means of the pressurized fluid applied to the port 21b from the pump 31 through the passages 30, 27 and 22, thereby to make the second pump-motor 14 conditioned to its full displacement in the negative direction.

Under this state, when the accelerator pedal 35 is depressed to increase the engine rotation and the differential gear unit 12 is operated, the spool 26c of the servo valve 26 is moved leftwardly by the governor pressure applied thereto from the pump 31 through the governor valve G and the passage 32. When, the servo valve 26 functions to connect the passage 30 with the passage 25 and connect the passage 27 with the drain passage 28. This connects the port 21c of the third actuator 21 to the pump 31 through the passages 24, 25 and 30. At the same time, the port 21b is connected to the drain passage 28 through the passages 22 and 27. The piston 21a of the third actuator 21 is moved leftwardly by means of the pressurized fluid applied to the port 21c from the pump 31 to decrease the pump angle of the second pump-motor 14 toward the positive direction. Thus, the operation of the differential gear unit 12 is controlled in accordance with the change of the pump angle of the second pump-motor 14 to increase the speed ratio of the hydrostatic transmission. All other operation features and procedures are substantially the same as in the forward drive of the hydrostatic transmission and no repetition is made.

Figure 3:
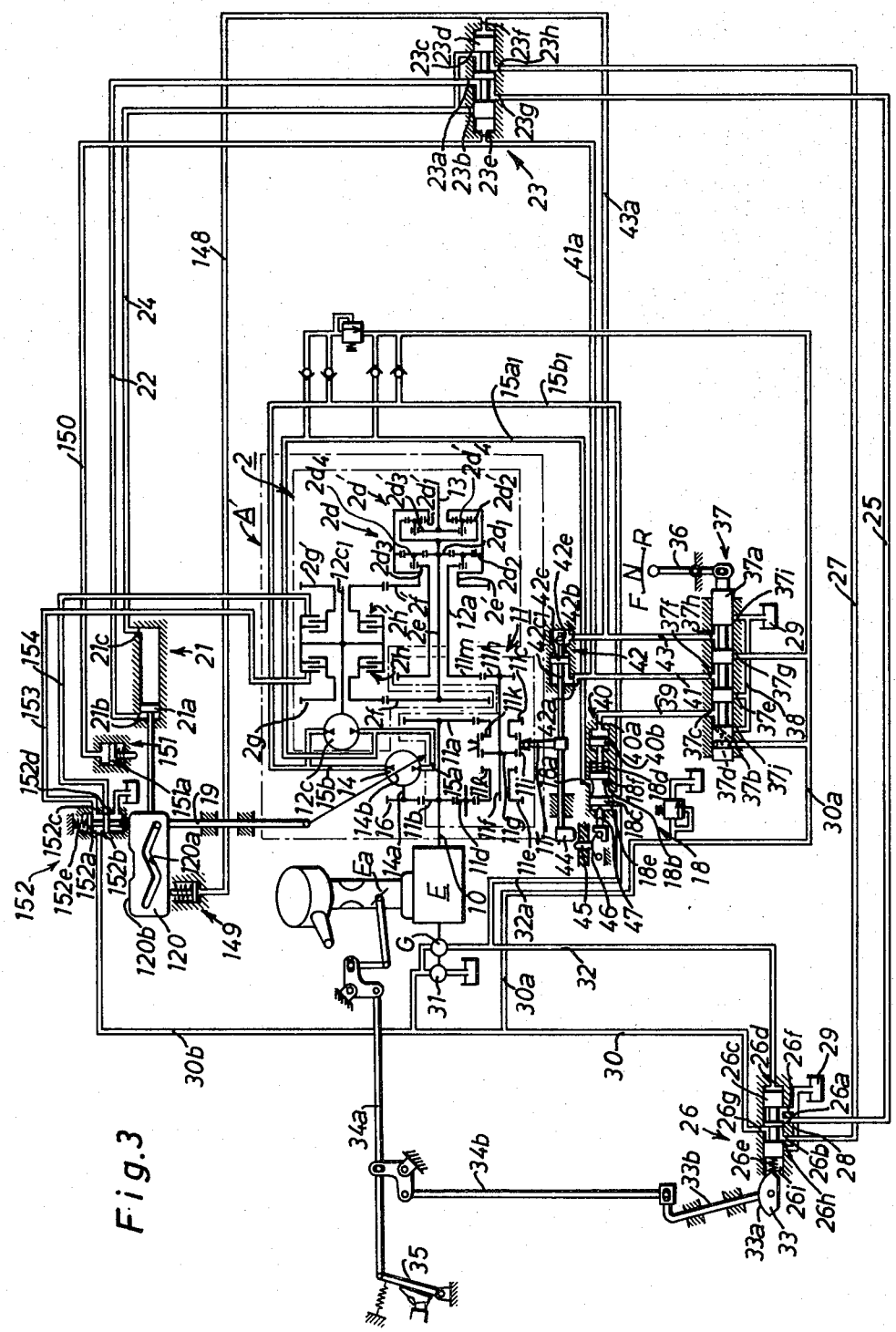
FIG. 3 is a schematic skeleton view showing a modification of the hydrostatic transmission.

FIG. 3 illustrates a modification of the previous embodiment. This modification is distinguished by its differential gear unit 2 and automatic control mechanism to hydraulically control the operation of the differential gear unit 2.

The differential gear unit 2 comprises generally first and second planetary gear sets $2d$ and $2d'$. A sun gear $2d_1$ of the first planetary gear set $2d$ is fixed on a first reaction shaft $2e$ and connected to a ring gear $2d_2'$ of the second planetary gear set $2d'$. A ring gear $2d_2$ of the first planetary gear set $2d$ is connected integrally with a second reaction shaft $2e'$ and connected to a sun gear $2d_1'$ of the second planetary gear set $2d'$. A planet gear $2d_4$ of the first planetary gear set $2d$ is journalled on a carrier $2d_3$ fixed on the intermediate shaft 12a and in mesh with the sun gear $2d_1$ and the ring gear $2d_2$. The intermediate shaft 12a is in surrounding relationship to the first reaction shaft $2e$ which is coaxial with the input shaft 10 and the output shaft 13. A gear $2f$ is fixed on the left end of the reaction shaft $2e$ and in mesh with a gear $2g$ of a low range clutch $2h$. A carrier $2d_3'$ of the second planetary gear set $2d'$ is fixed on the output shaft 13 to journal a planet gear $2d_4'$. The planet gear $2d_4'$ is in mesh with the ring gear $2d_2'$ fixed on the right end of the first reaction shaft $2e$. The second reaction shaft $2e'$ is provided thereon with a gear $2f'$ which is meshed with a gear $2g'$ of a high range clutch $2h'$. The low and high range clutches $2h$ and $2h'$ are mounted on the shaft $12c_1$ of the first pump-motor 12c previously described and the gears $2g$ and $2g'$ are rotatably journalled on the shaft $12c_1$. All other constructions and functions of this hydrostatic transmission are the same as those in the previous embodiment.

In the forward low speed or low range stage of operation of this hydrostatic transmission A', after the synchronized meshing engagement between the slide sleeve 11i and the spline 11k of the gear 11c is completed by means of the shifting operation of the manual shift valve 37, the rotation torque of the input shaft 10 given from the engine E in its idling rotation is applied to the first pump-motor 12c by way of a low range speed gear train including the gears 11a, 11c, 11h and 11m within the selector gear unit 11, the planet gear $2d_4$ on the intermediate shaft 12a, the first sun gear $2d_1$ on the first reaction shaft $2e$, the gear $2f$ and the gear $2g$ of the low range clutch $2h$. Simultaneously, the rotation torque of the input shaft 10 is transmitted to the second pump-motor 14 and the small pump 31 and is further applied to the output shaft 13 by way of an output planetary gear train including the gears 11a, 11c, 11h and 11m within the selector gear unit 11, the first planet gear $2d_4$ on the intermediate shaft 12a, the ring gear $2d_2$, the second sun gear $2d_1'$ and the second planet gear $2d_4'$ on the output shaft 13. In this state, the bypass valve 18 is positioned in its original position to connect the first and second branch circuits $15a_1$ and $15b_1$, so that no load is given to the first pump-motor 12c, and the output shaft 13 is arrested by the load exerted thereon. Meanwhile, the low range speed gear train is driven by the rotation torque of the input shaft 10 to rotate the first pump-motor 12c as a pump, and the output planetary gear train is locked by the load on the output shaft 13.

When the engine E is accelerated, which applies the governor pressure to the port 18e of the bypass valve 18 to cause the rightward movement of the spool 18c, the first and second branch circuits $15a_1$ and $15b_1$ are isolated from each other, thereby to complete the circulating closed circuit for the first and second pump-motors 12c and 14. Thus, the pressurized fluid discharged from the first pump-motor 12c passes necessarily through the second pump-motor 14 so that the pressurized fluid from the first pump-motor 12c is regulated by the second pump-motor 14 conditioned to its full displacement in the positive direction.

Figure 4:
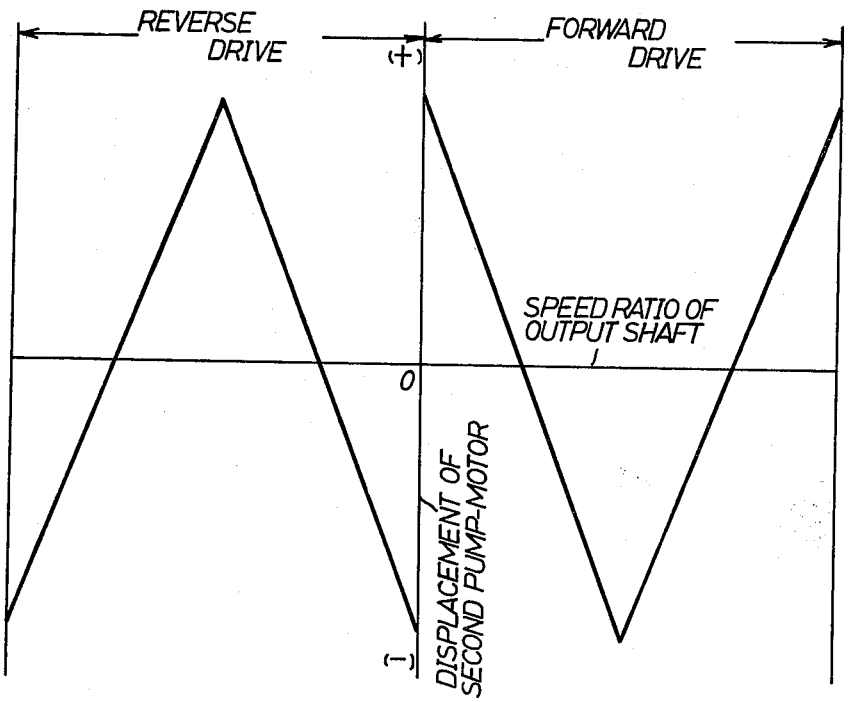
FIG. 4 is a graphic chart illustrating certain operating characteristics of the modification.

As the pump displacement of the second pump-motor 14 is decreased to be zero, a hydraulic load is exerted on the first pump-motor 12c in accordance with the pump angle of the second pump-motor 14 to decrease the rotation speed of the first pump-motor 12c below that while the output shaft 13 is arrested. Thus, the output planetary gear train transmits the rotation torque of the input shaft 10 to the output shaft 13 in response to the reaction force exerted thereon from the low range gear train in accordance with the decrease of the rotation of the first pump-motor 12c. The rotation of the output shaft 13 is increased either by the increase of the engine rotation or the further decrease of the pump angle of the second pump-motor 14 as shown in FIG. 4. Until the pump displacement of the second pump-motor 14 becomes zero, the engine torque transmitted to the intermediate shaft 12a is divided into the output planetary gear train and the low range gear train. The rotation torque given to the low range gear train is then converted into hydraulic pressure by the pumping operation of the first pump-motor 12c. The fluid pressure from the first pump-motor 12c is applied to the second pump-motor 14. Then, the second pump-motor 14 conducts its motor action by the fluid pressure applied thereon.

In case the pump angle of the second pump-motor 14 is over-centered or positioned in the negative direction, the rotation torque of the input shaft 10 is divided into first and second mechanical power paths. The first divided rotation torque is transmitted to the output shaft 13 by way of the output planetary gear train, as mentioned above. The second divided rotation torque of the input shaft 10 rotates the second pump-motor 14 as a pump and is then converted into hydraulic pressure by the pumping operation of the second pumpmotor 14. This hydraulic pressure is then applied to the first pump-motor 12c through the first line circuit 15a. The first pump-motor 12c conducts its motor operation to convert the hydraulic pressure into the rotation torque of the shaft $12c_1$ of the pump-motor 12c. This rotation torque is mechanically transmitted to the output shaft 13 by way of the low range gear train, thereby to increase the rotation speed ratio of the hydrostatic transmission A'.

After the second pump-motor 14 is conditioned to its full negative displacement, the rotation speed ratio of the transmission is further increased by a procedure such that the low range clutch 2h is disengaged and the high range clutch 2h' is engaged. Upon the engagement of the high range clutch 2h', all the rotation torque of the input shaft 10 driven by the engine E is transmitted to the intermediate shaft 12a across the selector gear unit 11 and, in turn, is divided into the mentioned first and second power paths within the planetary gear sets 2d and 2d'. The first divided rotation torque is transmitted to the output shaft 13 by way of the output planetary gear train. The second divided rotation torque is transmitted to the shaft $12c_1$ of the first pump-motor 12c by way of a high range gear train including the first planet gear $2d_4$, the ring gear $2d_2$, the gear $2f'$ and the gear $2g'$ of the high range clutch 2h'. This rotation torque of the shaft $12c_1$ is converted into hydraulic pressure by pumping operation of the first pump-motor 12c. The hydraulic pressure is then applied to the second pump-motor 14 by way of the second line circuit 15b and converted into the rotation torque of the shaft 14a of the second pump-motor 14. This rotation torque is fed back to the input shaft 10 by way of the gears 16 and 11b.

When the displacement of the second pump-motor 14 is sequentially decreased toward the positive direction and returned to its zero-displacement, the displacement capacity of the second pump-motor 14 becomes zero, thereby to arrest the rotation of the first pump-motor 12c. Under this stage, all the rotation torque of the input shaft 10 is mechanically transmitted to the output shaft 13 by way of the output planetary gear train. Further displacement of the second pump-motor 14 over its zero position toward the positive direction will rotate the first pump-motor 12c as a motor to increase the rotation speed ratio of the hydrostatic transmission A', as shown in FIG. 4.

Described hereinafter is the automatic control mechanism to control the operation of the hydrostatic transmission A' in response to the shifting operation of the manual shift valve 37. This automatic control mechanism comprises a second selector valve 152 to selectively engage and disengage the low and high range clutches 2h and 2h' in accordance with the pump angle of the second pump-motor 14. The second selector valve 152 is provided therein with a spool 152a to selectively connect a port 152b with a port 152c or a port 152d. The spool 152a is normally biased downwardly by a coil spring 152e and engaged at its lower projection with a cam face 120b of a cam plate 120 which is securely connected with the piston 21a of the third actuator 21. The port 152b is connected to the small pump 31 through a branch passage 30b, and the ports 152c and 152d are respectively connected with the low and high range clutches 2h and 2h' through a passage 153 and a passage 154. The cam plate 120 is reciprocable rightwardly and leftwardly in the figure and provided thereon with a cam slot 120a to slidably hold the top end of the rod 19 therethrough. The rod 19 is operatively connected at its other end with the swash plate 14b of the second pump-motor 14.

The automatic control mechanism further comprises a fourth actuator 149 to define the leftward movement of the cam plate 120 and a fifth actuator 151 to define the rightward movement of the cam plate 120. The fourth actuator 149 is connected in its pressure chamber with the port 23f of the selector valve 23 through a passage 148 and includes a normally retracted piston to block the leftward movement of the cam plate 120. The fifth actuator 151 is connected in its pressure chamber with the port 23e of the selector valve 23 through a passage 150 and provided therein with a normally retracted piston 151a to block the rightward movement of the cam plate 120. The constructions and functions of the third actuator 21, the selector valve 23 and the servo valve 26 are the same as those in the previous embodiment seen in FIG. 1. Thus, the same reference numerals indicate the same component parts and portions.

The operation of the mentioned automatic control mechanism is described below in detail. When the manual shift valve 37 is positioned in its N position during the idling rotation of the engine E and the selector gear unit 11 is positioned in its neutral position, the servo valve 26 functions to connect the passage 30 with the passage 27 and to connect the passage 25 with the drain passage 28. In this instance, the spool 26c of the servo valve 26 is biased rightwardly by the coil spring 26e.

When the manual shift valve 37 is shifted to its F position to synchronously complete the forward low speed drive power train of the hydrostatic transmission A', the spool 23d of the selector valve 23 is moved rightwardly in response to the activation of the second actuator 42 by the pressurized fluid applied to the port 23e from the pump 31 through the passages 41a and 41, the mutual shift valve 37, and the passages 30a and 30 in sequence. Thus, the selector valve 23 acts to connect the passage 27 with the passage 24 and connect the passage 25 with the passage 22, and the piston 21a of the third actuator 21 is displaced to its leftward stroke end by means of the pressurized fluid applied to the port 21c from the pump 31 through the passages 30, 27 and 24. This moves the cam plate 120 leftwardly to make the second pump-motor 14 conditioned to its full positive displacement. Then, the second selector valve 152 connects the branch passage 30b to the passage 153 by the retraction of the spool 152a caused by the engagement of the can face 120b and the projection of the spool 152a. This connects the small pump 31 with the low range clutch 2h through the passages 30b and 153 to engage the low range clutch 2h. At the same time, the fifth actuator 151 is operated by the pressurized fluid applied thereto from the pump 31 through the passages 150, 41a and 41, the manual shift valve 37 and the passages 30a and 30 in sequence. Consequently, the fifth actuator 151 blocks the rightward movement of the cam plate 120.

Under this state, when the accelerator pedal 35 is depressed to increase the rotation of the engine E, the spool 26c of the servo valve 26 is moved leftwardly by the governor pressure applied to the port 26d from the pump 31 through the governor valve G and the passage 32. Then, the servo valve 26 functions to connect the passage 30 with the passage 25 and connect the passage 27 with the drain passage 28. This connects the port 21b of the third actuator 21 to the pump 31 through the passages 22, 25 and 30, and the port 21c is connected to the drain passage 28 through the passages 24 and 27. Then, the piston 21a of the third actuator 21 is moved rightwardly by means of the pressurized fluid applied to the port 21b from the pump 31 to decrease the pump angle of the second pump-motor 14 toward the negative direction. Thus, the pump angle of the second pump-motor 14 is continuously varied from its maximum positive angle to its maximum negative angle in the course of the rightward movement of the cam plate 120 to control the forward low speed drive power train of the differential gear unit 2. When the top end of the rod 19 reaches the first curved portion of the cam slot 120a during the rightward movement of the cam plate 120, the second selector valve 152 functions to connect the branch passage 30b to the passage 154 by the downward movement of the spool 152a. This connects the small pump 31 with the high range clutch 2h' through the passages 30b and 154 to engage the high range clutch 2h' and disengage the low range clutch 2h. After the high range clutch 2h' is engaged, the pump angle of the second pump-motor 14 is further varied from its maximum negative angle to its maximum positive angle in the course of the remaining rightward movement of the cam plate 120 to control the forward high speed range of the hydrostatic transmission A'.

Although a certain specific embodiment of the present invention has been shown and described, it is obvious that many modifications and variations thereof are possible in light of these teachings. It is to be understood therefore that within the scope of the appended claims, the invention may be practiced otherwise than as specifically described herein.

What is claimed is:

1. In a hydrostatic transmission comprising
   an input means;
   an output means;
   a hydraulically controlled speed differential means drivingly connected with said input means for transmitting the rotation torque of said input means to said output means and including a first hydraulic positive-displacement pumpmotor functionable as a reaction element therefor;
   a second hydraulic positive-displacement pump-motor of the variable type drivingly connected with said input means for controlling said first pump-motor in response to the displacement ratio thereof;
   means for providing hydraulic communication between said first and second pump-motors; and
   a drive power train selector means assembled with said speed differential means for selectively completing the forward and reverse drive power trains inbetween said input means and said output means;
   the improvement comprising
   a fluid actuator connected to a fluid pump driven by said input means;
   a connecting means for operatively connecting said actuator to the swash plate of said second pump-motor to continuously vary the pump angle of said second pump-motor;
   a first responsive means interposed between said actuator and said fluid pump for shifting the fluid pressure applied to said actuator from said fluid pump in response to the shifting operation of said drive power train selector means to preliminarily set the initial condition of said actuator so as to determine the initial pump angle of said second pump-motor; and
   a second responsive means interposed between said first responsive means and said fluid pump for controlling the fluid pressure applied to said actuator from said fluid pump in accordance with the driving condition of said input means to control the displacement ratio of said second pumpmotor.

2. A hydrostatic transmission as set forth in claim 1, wherein said drive power train selector means comprises a second fluid actuator connected to said fluid pump for shifting said drive power train selector means; and a manual shift valve interposed between said fluid pump and said second actuator for selecting the fluid pressure applied to said second actuator from said fluid pump to control the operation of said second actuator; and
   said first responsive means is a selector valve interposed between said fluid pump and said first named actuator to shift the fluid pressure applied to said first named actuator from said fluid pump in response to the operation of said second actuator.

3. A hydrostatic transmission as set forth in claim 2, wherein said hydraulic communication means includes a bypass valve interposed between said first and second pump-motors to control the communication between said first and second pumpmotors in response to the operation of said second actuator and the governor pressure applied thereto from said fluid pump in accordance with the rotation speed of said input means.

4. A hydrostatic transmission as set forth in claim 2, wherein said second responsive means is a servo valve interposed between said fluid pump and said selector valve to control the fluid pressure applied to said first named actuator from said fluid pump in accordance with the rotation speed of said input means.

5. A hydrostatic transmission as set forth in claim 1, wherein said connecting means comprises a cam means operatively connected with the swash plate of said second pump-motor for continuously varying the pump angle of said second pumpmotor from its maximum positive angle to its maximum negative angle and vice versa during the operation of said actuator.

* * * * *